United States Patent
Salter et al.

(10) Patent No.: US 12,103,420 B2
(45) Date of Patent: Oct. 1, 2024

(54) COLLECTIVE VEHICLE POWER MANAGEMENT

(71) Applicant: Ford Global Technologies, LLC, Dearborn, MI (US)

(72) Inventors: Stuart C. Salter, White Lake, MI (US); William H. Wurz, San Francisco, CA (US); Ryan O'Gorman, Beverly Hills, MI (US); Zeljko Deljevic, Plymouth, MI (US); Peter Phung, Windsor (CA)

(73) Assignee: Ford Global Technologies, LLC, Dearborn, MI (US)

( * ) Notice: Subject to any disclaimer, the term of this patent is extended or adjusted under 35 U.S.C. 154(b) by 386 days.

(21) Appl. No.: 17/477,834

(22) Filed: Sep. 17, 2021

(65) Prior Publication Data
US 2023/0097893 A1   Mar. 30, 2023

(51) Int. Cl.
*B60L 9/00*       (2019.01)
*B60L 53/14*      (2019.01)
*B60L 53/35*      (2019.01)
*B60L 53/62*      (2019.01)
*B60L 58/12*      (2019.01)
*G05B 19/042*     (2006.01)
*G06Q 10/0631*    (2023.01)
*G07C 3/00*       (2006.01)
*G07C 5/00*       (2006.01)
*B60K 6/28*       (2007.10)

(52) U.S. Cl.
CPC .............. *B60L 53/62* (2019.02); *B60L 53/14* (2019.02); *B60L 53/35* (2019.02); *B60L 58/12* (2019.02); *G05B 19/042* (2013.01); *G06Q 10/06312* (2013.01); *G06Q 10/06313* (2013.01); *G07C 3/00* (2013.01); *G07C 5/008* (2013.01); *B60K 6/28* (2013.01); *B60Y 2200/91* (2013.01); *B60Y 2200/92* (2013.01); *B60Y 2300/91* (2013.01); *G05B 2219/21109* (2013.01); *G05B 2219/2637* (2013.01)

(58) Field of Classification Search
CPC combination set(s) only.
See application file for complete search history.

(56) References Cited

U.S. PATENT DOCUMENTS

| 2012/0126754 | A1  | 5/2012 | Akahane |  |
|---|---|---|---|---|
| 2017/0155253 | A1* | 6/2017 | Veda | H02J 3/008 |
| 2019/0043001 | A1* | 2/2019 | Woulfe | G01C 21/3438 |

(Continued)

FOREIGN PATENT DOCUMENTS

CN   109895651 A   6/2019

*Primary Examiner* — Adam M Alharbi
(74) *Attorney, Agent, or Firm* — Christopher Storms; Bejin Bieneman PLC

(57) ABSTRACT

A computer includes a processor and a memory storing instructions executable by the processor to receive data indicating a plurality of tasks to be performed at a site by a plurality of electric machines, receive charge statuses of the electric machines and of a plurality of first electric vehicles at the site, and generate an ordered allocation of a plurality of charging operations for the electric machines and first electric vehicles based on the plurality of tasks and on the charge statuses. The charging operations include charging at least one of the electric machines or first electric vehicles from a second electric vehicle with charge ports that is scheduled to visit the site from offsite.

19 Claims, 5 Drawing Sheets

(56) References Cited

U.S. PATENT DOCUMENTS

| | | |
|---|---|---|
| 2019/0393706 A1 | 12/2019 | Huggins |
| 2020/0151014 A1* | 5/2020 | Sukhi .................... G06F 9/505 |
| 2020/0338999 A1 | 10/2020 | Press et al. |
| 2021/0086647 A1 | 3/2021 | Kiessling et al. |
| 2022/0048195 A1* | 2/2022 | Rastegar ................ B25J 9/0084 |

* cited by examiner

COLLECTIVE VEHICLE POWER MANAGEMENT

BACKGROUND

Types of electric vehicles include plug-in hybrid electric vehicles (PHEVs), hybrid electric vehicles (HEVs), and battery electric vehicles (BEVs). Electric vehicles include electric propulsions that generate energy and translate the energy into motion of the electric vehicles. An electric propulsion may be an all-electric powertrain including batteries, an electric motor, and a transmission that transfers rotational motion to the wheels; or a hybrid powertrain including elements of a conventional powertrain and of the all-electric powertrain.

DETAILED DESCRIPTION

Figure 1:
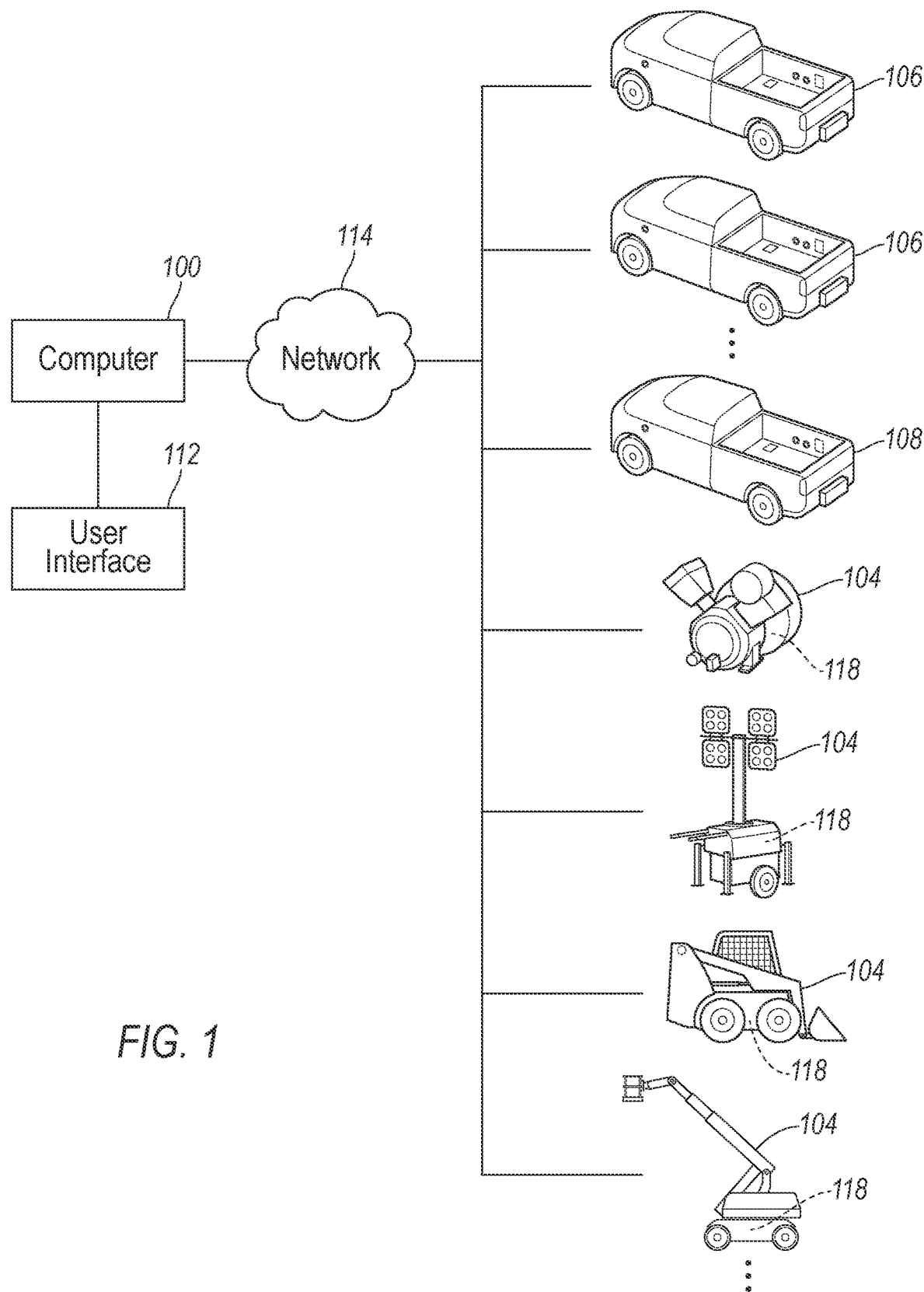
FIG. 1 is a diagram of an example group of electric vehicles and electric machines.

This disclosure describes systems and techniques for managing energy consumption by a plurality of electric machines and a plurality of first electric vehicles at a site such as a construction site or other work site. The system can extend the performance of the electric machines and can permit the first electric vehicles to power the electric machines for longer when performing a task at the site.

A computer can generate an ordered allocation of charging operations for the electric machines and the first electric vehicles. A charging operation is an action that charges or discharges electrical current between an electrical storage device, e.g., a battery, and an electrical power source. The ordered allocation of charging operations can be based on a plurality of tasks to be performed at the site by the plurality of machines as well as on the charge statuses of the electric machines and the first electric vehicles. The charging operations include charging the electric machines so that the electric machines are sufficiently charged to perform the tasks when scheduled to do so, e.g., from the first electric vehicles. The charging operations can include charging at least one of the electric machines or the first electric vehicles from a second electric vehicle with charge ports that is scheduled to visit the site from offsite, e.g., when the first electric vehicles do not have sufficient charge for the electric machines to perform all the tasks on a given day. The system can help ensure that the electric machines and first electric vehicles have sufficient charge for performing the tasks while minimizing a total power draw.

A computer includes a processor and a memory storing instructions executable by the processor to receive data indicating a plurality of tasks to be performed at a site by a plurality of electric machines, receive charge statuses of the electric machines and of a plurality of first electric vehicles at the site, and generate an ordered allocation of a plurality of charging operations for the electric machines and first electric vehicles based on the plurality of tasks and on the charge statuses. The charging operations include charging at least one of the electric machines or first electric vehicles from a second electric vehicle with charge ports that is scheduled to visit the site from offsite.

The site may be a bounded geographic area over which the first electric vehicles are authorized to travel.

The second electric vehicle may be scheduled to visit the site from offsite for a noncharging purpose before generating the ordered allocation of the charging operations.

The charging operations may include scheduling the second electric vehicle to visit the site from offsite for charging the at least one of the electric machines or first electric vehicles.

The charging operations may include charging the electric machines from the first electric vehicles.

The charging operations may include instructing one of the first electric vehicles to travel to a location offsite and recharge at the location. Instructing the one of the first electric vehicles to travel to the location offsite may include instructing the one of the first electric vehicles to remain at the location overnight.

The charging operations may include drawing charge from one of the electric machines that is not scheduled to perform any of the tasks.

The charge statuses may occur in real time, and the instructions may further include instructions to modify the ordered allocation of the charging operations in response to the charge statuses indicating insufficient charge for performing at least one of the tasks. The instructions may further include instructions to receive a prioritization of the tasks, and modifying the ordered allocation of the charging operations may include instructing at least one of the electric machines to turn off according to the prioritization.

The first electric vehicles may include respective pluralities of the charge ports, and modifying the ordered allocation of the charging operations may include instructing at least one of the first electric vehicles to disconnect the charge ports of that first electric vehicle.

The first electric vehicles may include respective pluralities of the charge ports, and modifying the ordered allocation of the charging operations may include instructing at least one of a first one or a second one of the first electric vehicles to switch one of the electric machines from charging from one of the charge ports of the first one of the first electric vehicles to charging from one of the charge ports of the second one of the first electric vehicles. Instructing the at least one of the first one or the second one of the first electric vehicles to switch one of the electric machines may include instructing the at least one of the first one or the second one of the electric vehicles to output a message indicating to switch the one of the electric machines from charging from the one of the charge ports of the first one of the first electric vehicles to charging from the one of the charge ports of the second one of the first electric vehicles.

Instructing the at least one of the first one or the second one of the first electric vehicles to switch one of the electric machines may include instructing the at least one of the first one or the second one of the electric vehicles to actuate a robotic arm to move a power cord of the one of the electric machines from the one of the charge ports of the first one of the first electric vehicles to the one of the charge ports of the second one of the first electric vehicles.

Modifying the ordered allocation of the charging operations may include instructing one of the first electric vehicles to travel from a current location at the site to a new location at the site.

Modifying the ordered allocation of the charging operations may include instructing one of the first electric vehicles to turn off an operation of that first electric vehicle.

The instructions may further include instructions to instruct at least one of the first electric vehicles to disconnect a charge port of that first electric vehicle in response to an unscheduled charging of one of the electric machines from that charge port.

The tasks may include a plurality of types of the tasks. The electric machines may include a plurality of types of the electric machines associated with the respective types of the tasks.

A method receiving data indicating a plurality of tasks to be performed at a site by a plurality of electric machines, receiving charge statuses of the electric machines and of a plurality of first electric vehicles at the site, and generating an ordered allocation of a plurality of charging operations for the electric machines and first electric vehicles based on the plurality of tasks and on the charge statuses. The charging operations include charging at least one of the electric machines or first electric vehicles from a second electric vehicle with charge ports that is scheduled to visit the site from offsite.

With reference to the Figures, wherein like numerals indicate like parts throughout the several views, a computer 100 includes a processor and a memory storing instructions executable by the processor to receive data indicating a plurality of tasks to be performed at a site 102 by a plurality of electric machines 104, receive charge statuses of the electric machines 104 and of a plurality of first electric vehicles 106 at the site 102, and generate an ordered allocation of a plurality of charging operations for the electric machines 104 and first electric vehicles 106 based on the plurality of tasks and on the charge statuses. The charging operations include charging at least one of the electric machines 104 or first electric vehicles 106 from a second electric vehicle 108 with charge ports 110 that is scheduled to visit the site 102 from offsite.

With reference to FIG. 1, the computer 100 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The computer 100 can thus include a processor, a memory, etc. The memory of the computer 100 can include media for storing instructions executable by the processor as well as for electronically storing data and/or databases, and/or the computer 100 can include structures such as the foregoing by which programming is provided. The computer 100 can be multiple computers coupled together.

The computer 100 can be communicatively coupled to a user interface 112. The user interface 112 presents information to and receives information from an operator of the computer 100. The user interface 112 may include dials, digital readouts, screens, speakers, and so on for providing information to the operator, e.g., human-machine interface (HMI) elements such as are known. The user interface 112 may include a keyboard, buttons, knobs, keypads, touchscreen, mouse, microphone, and so on for receiving information from the operator.

The computer 100 can communicate with the first electric vehicles 106, second electric vehicle 108, and electric machines 104 via a network 114. The network 114 represents one or more mechanisms by which the computer 100 may communicate with remote servers. Accordingly, the network 114 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, IEEE 802.11, etc.), local area networks (LAN) and/or wide area networks (WAN), including the internet, providing data communication services.

The first electric vehicles 106 and second electric vehicle 108 may be any passenger or commercial automobile such as cars, trucks, sport utility vehicles, crossovers, vans, minivans, taxis, buses, etc. Each first electric vehicle 106 or second electric vehicle 108 includes an electric propulsion 116, as described below. The first electric vehicles 106 and second electric vehicle 108 can be plug-in hybrid electric vehicles (PHEVs), hybrid electric vehicles (HEVs), battery electric vehicles (BEVs), etc.

The electric machines 104 are machines, e.g., tools, that operate on electric current, either direct current or alternating current. The electric machines 104 can operate from an outside power supply such as one of the first electric vehicles 106. Alternatively or additionally, the electric machines 104 can include machine batteries 118 that are rechargeable from an outside power supply such as one of the first electric vehicles 106. The machine batteries 118 can be any suitable type, e.g., lithium-ion batteries, nickel-metal hydride batteries, lead-acid batteries, ultracapacitors, etc. Each electric machine 104 with a machine battery 118 can have a charge status, i.e., a quantity of energy stored in the machine battery 118. The electric machines 104 include a plurality of types, e.g., equipment for construction, plumbing, carpentry, electrical work, etc., such as air compressors, lighting, skid loaders, cranes, etc.

Figure 2:
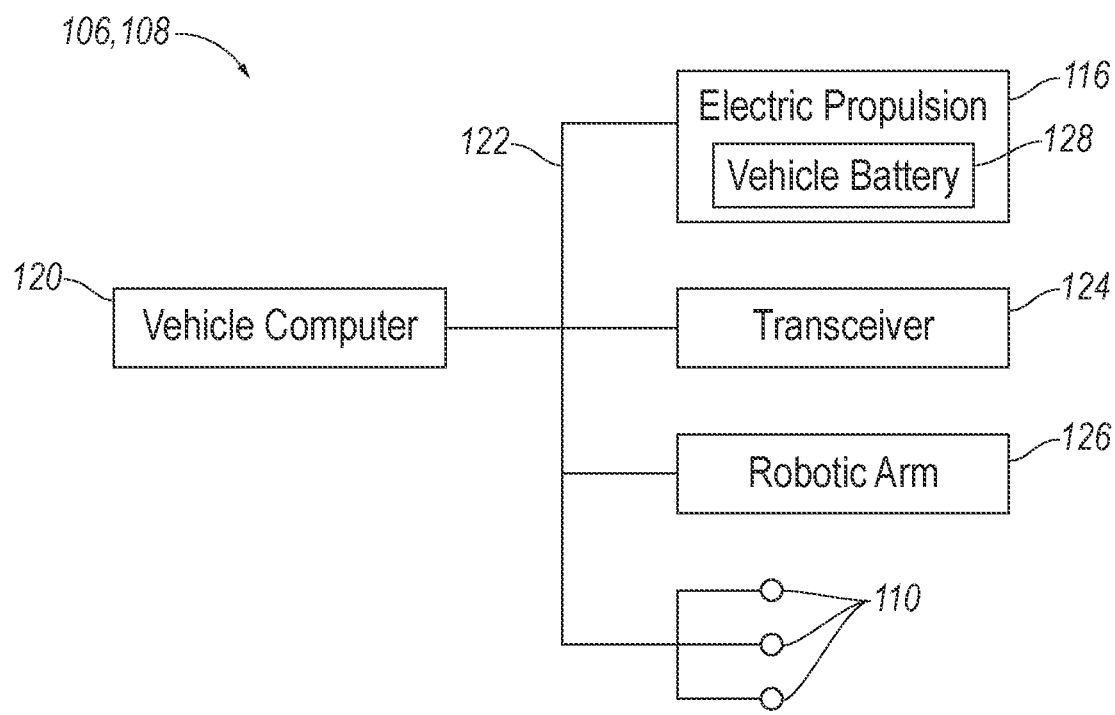
FIG. 2 is a block diagram of one of the electric vehicles.

With reference to FIG. 2, each first electric vehicle 106 and second electric vehicle 108 can include a vehicle computer 120. The vehicle computer 120 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The vehicle computer 120 can thus include a processor, a memory, etc. The memory of the vehicle computer 120 can include media for storing instructions executable by the processor as well as for electronically storing data and/or databases, and/or the vehicle computer 120 can include structures such as the foregoing by which programming is provided. The vehicle computer 120 can be multiple computers coupled together onboard one of the first electric vehicles 106 or second electric vehicle 108.

The vehicle computer 120 may transmit and receive data through a communications network 122 such as a controller area network (CAN) bus, Ethernet, WiFi, Local Interconnect Network (LIN), onboard diagnostics connector (OBD-II), and/or by any other wired or wireless communications network. The vehicle computer 120 may be communicatively coupled to the electric propulsion 116, a transceiver 124, the charge ports 110, a robotic arm 126, and other components via the communications network 122.

The electric propulsion 116 of one of the first electric vehicles 106 or second electric vehicle 108 generates energy and translates the energy into motion of the electric vehicle 106, 108. The electric propulsion 116 may be an all-electric powertrain including vehicle batteries 128, an electric motor, and a transmission that transfers rotational motion to the wheels; a hybrid powertrain including elements of a conventional powertrain and of the all-electric powertrain; etc. The vehicle batteries 128 may be of any suitable type for vehicular electrification, for example, lithium-ion batteries, nickel-metal hydride batteries, lead-acid batteries, ultracapacitors, etc. Each first electric vehicle 106 and second electric vehicle 108 can have a charge status, i.e., a quantity of energy stored in the vehicle batteries 128 of that electric vehicle 106, 108. The electric propulsion 116 can include an electronic control unit (ECU) or the like that is in communication with and receives input from the vehicle computer 120 and/or a human operator. The human operator may control the electric propulsion 116 via, e.g., an accelerator pedal and/or a gear-shift lever.

The transceiver 124 may be adapted to transmit signals wirelessly through any suitable wireless communication protocol, such as cellular, Bluetooth®, Bluetooth® Low Energy (BLE), ultra-wideband (UWB), WiFi, IEEE 802.11a/b/g/p, cellular-V2X (CV2X), Dedicated Short-Range Communications (DSRC), other RF (radio frequency) communications, etc. The transceiver 124 may be adapted to communicate with a remote server, that is, a server distinct and spaced from the vehicle. The remote server may be located outside the first electric vehicle 106 or second electric vehicle 108. For example, the remote server may be associated with another vehicle (e.g., V2V communications), an infrastructure component (e.g., V2I communications), an emergency responder, a mobile device associated with the owner of the first electric vehicle 106 or second electric vehicle 108, the computer 100 via the network 114, etc. The transceiver 124 may be one device or may include a separate transmitter and receiver.

Figure 3:
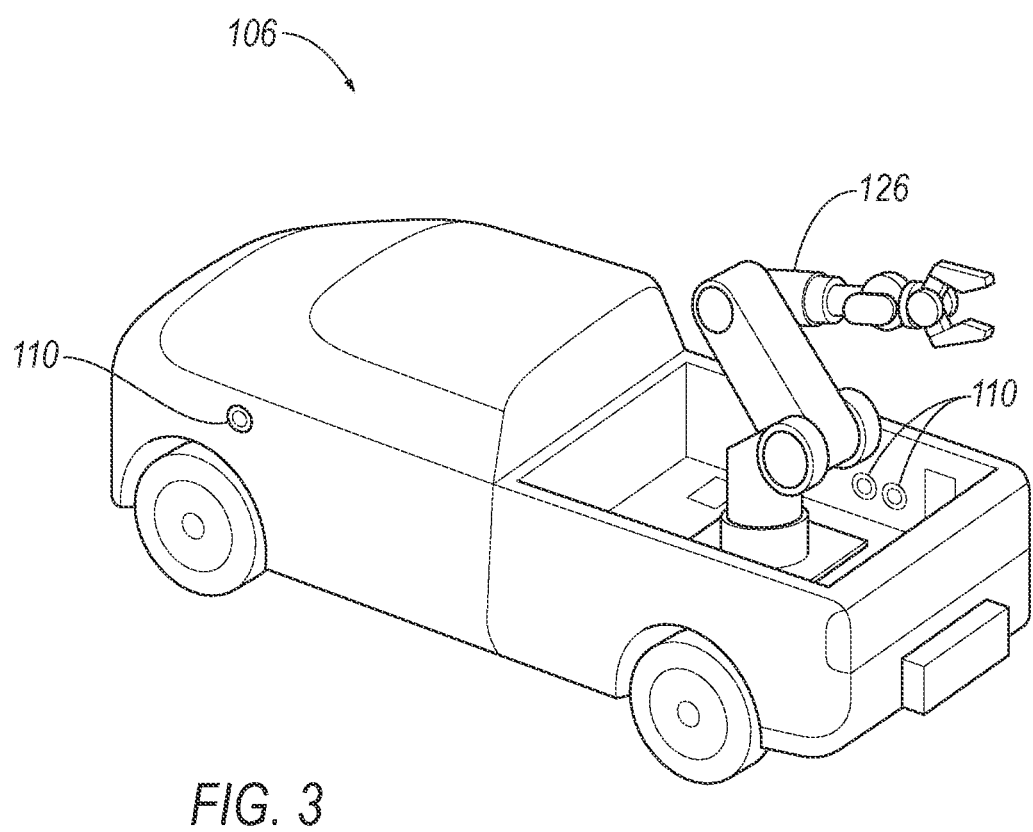
FIG. 3 is a perspective view of one of the electric vehicles.

With reference to FIG. 3, the charge ports 110 are features to which the operator can electrically connect nonvehicle loads, i.e., electrical loads that are not part of the first electric vehicle 106 or second electric vehicle 108 containing the charge ports 110, e.g., the electric machines 104, the first electric vehicle 106 when connected to the second electric vehicle 108, etc. The charge ports 110 can be any type of feature to which a nonvehicle load can be securely and temporarily attached. For example, the charge ports 110 can be studs, to which the nonvehicle loads can be electrically connected by clipping or screwing. For another example, the charge ports 110 can be outlets into which electrical connectors can be plugged.

The first electric vehicle 106 can include the robotic arm 126. The robotic arm 126 is a mechanical arm formed of links connected at joints allowing rotational or translational displacement. The links and joints can form a kinematic chain. The last link in the kinematic chain can be an end effector such as a gripper. The robotic arm 126 can be positioned on the first electric vehicle 106 so that the end effector is able to reach at least some of the charge ports 110 of the first electric vehicle 106. As described below, the robotic arm 126 can be used to plug or unplug the electric machines 104 from the charge ports 110.

Figure 4:
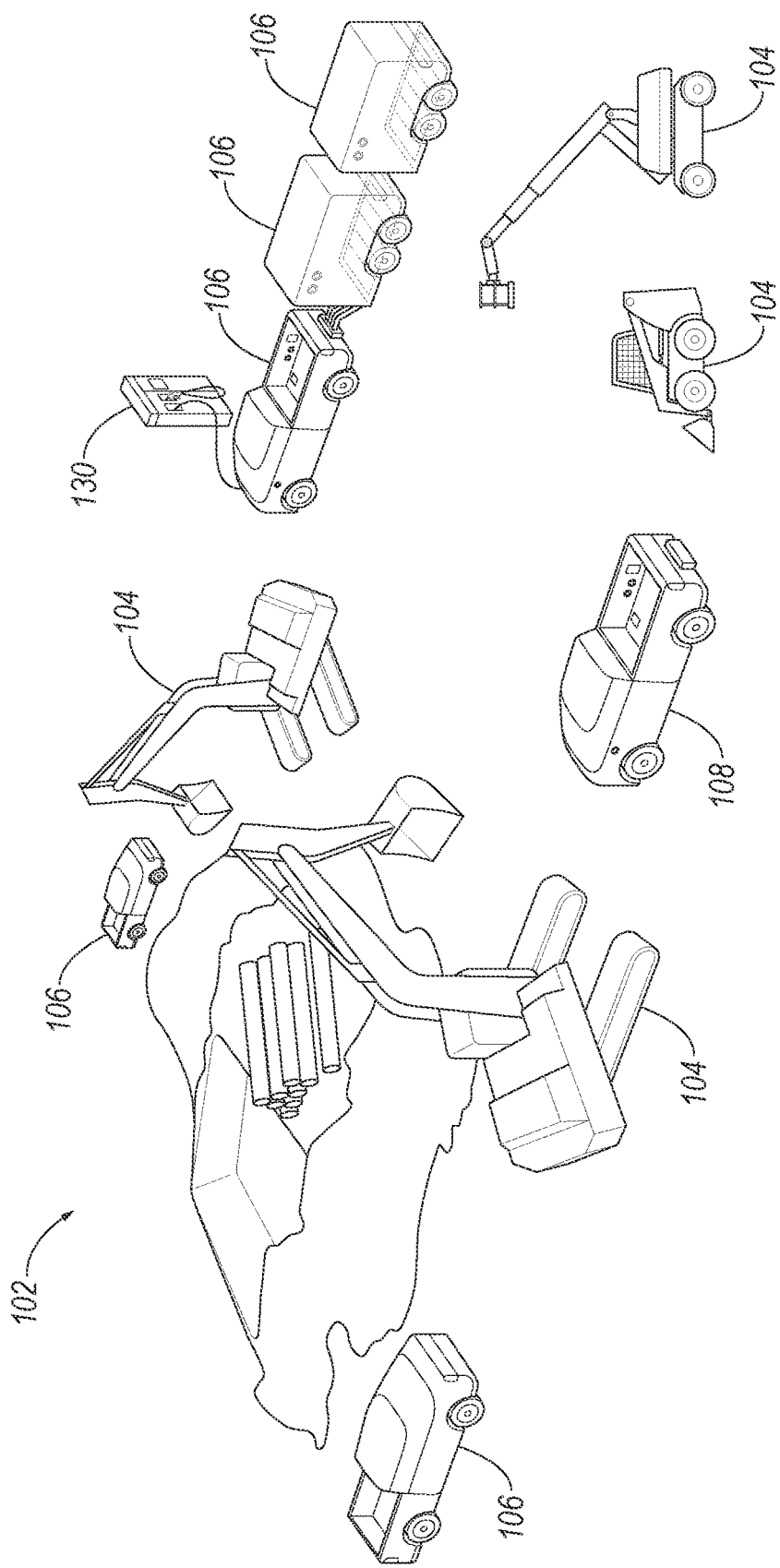
FIG. 4 is a diagram of the group of electric vehicles and electric machines at a site.

With reference to FIG. 4, the site 102 is where the tasks are located. The site 102 can be a bounded geographic area over which the first electric vehicles 106 are authorized to travel. For example, the site 102 can be a construction site 102 for a building, and the first electric vehicles 106 can be operated by a construction company responsible for constructing the building. The first electric vehicles 106 are authorized to travel over the site 102 by default without requiring any special permissions. The second electric vehicle 108 may be operated by a third party and may not be authorized by default to travel into or over the site 102. The site 102 can include one or more on-site chargers 130, which can be connected directly to a local energy grid. The site 102 may have fewer on-site chargers 130 than first electric vehicles 106.

The computer 100 can receive the data indicating the plurality of the tasks to be performed at the site 102, e.g., over a time period such as the following day, by the electric machines 104. The data indicating the tasks can list times at which the tasks should start and expected durations for performing the tasks. Alternatively or additionally, the data indicating the tasks can list dependencies between the tasks or an order for performing the tasks, e.g., a first task must be performed before second and third tasks, the second and third tasks must be performed before a fourth task, a fifth task can be performed without regard for the first through fourth tasks, etc.

The tasks can be of a plurality of types, e.g., excavating a basement, pouring concrete, building a brick wall, building an interior wall, installing plumbing fixtures, etc. The types of tasks can be preset types stored in the memory of the computer 100.

Each type of task can have one or more types of electric machines 104 designated for performing the task. The designated types of electric machines 104 for the respective types of tasks can be stored in the memory of the computer 100. For example, a crane can be designated for assembling a building frame, a concrete mixer can be designated for pouring concrete, etc.

The tasks can have respective expected energy consumptions for performing the tasks. For the purposes of this disclosure, an "expected energy consumption" is defined as a quantity of energy to perform an action, e.g., a task, as estimated before performing the action. The expected energy consumptions of different types of tasks are different. The expected energy consumption of a task can be based on the type of the task. For example, installing a sink can have a preset expected energy consumption stored in the memory of the computer 100. The expected energy consumption of a task can also be based on one or more values characterizing the scope of the task. For example, the expected energy consumption of installing an interior wall can be based on a length of the wall, the expected energy consumption of pouring concrete can be based on a surface area of the poured concrete, etc. The computer 100 can store formulas for the expected energy consumptions of the preset types of tasks based on the value(s) characterizing the scope of the task, e.g., a formula that receives the length of an interior wall and outputs the expected energy consumption of installing the wall, a formula that receives the surface area to be filled with concrete and outputs the expected energy consumption of pouring the concrete, etc.

The computer 100 can receive data indicating the charge statuses of the electric machines 104 and of the first electric vehicles 106 at the site 102. A charge status is data indicating a quantity of charge in a battery or collection of batteries. The computer 100 can receive the charge statuses in real time, e.g., at frequent intervals such as every five minutes.

The computer 100 can receive a prioritization of the tasks. For example, the prioritization can be a sorting of the tasks into ordered tiers, e.g., a first tier, a second tier, etc. If the site 102 has insufficient charge for the electric machines 104 to perform all the tasks, the computer 100 can instruct the electric machines 104 to refrain from performing the tasks in the lowest tiers in order until there is sufficient charge for the remaining tasks. For a specific example, the sorting of the tasks into tiers can be a ranking of the tasks, i.e., each tier has a single task.

The computer 100 can generate the ordered allocation of charging operations for the electric machines 104 and the first electric vehicles 106 based on the data indicating the plurality of tasks and on the charge statuses. The computer 100 can generate the ordered allocation of charging operations so as to, e.g., minimize total expected energy consumption, minimize downtime for the first electric vehicles 106, provide the quickest performance of the tasks, optimize a cost function of more than one of the foregoing variables, etc. The generation of the ordered allocation of charging operations can be constrained by the number of the first electric vehicles 106 or charge ports 110, the locations of the tasks at the site 102, how many of the first electric vehicles 106 can be recharged at the site 102 by the on-site chargers 130 at one time, etc.

The computer 100 can instruct the first electric vehicles 106 to follow the ordered allocation of charging operations, e.g., to perform the charging operations when indicated by the allocation. The charging operations can include a plurality of types of charging operations, and the computer 100 can include different types of charging operations in the ordered allocation of charging operations as needed when generating the ordered allocation of charging operations. Types of charging operations can include, e.g., charging the electric machines 104 from the first electric vehicles 106, charging the first electric vehicles 106 from the on-site chargers 130, charging one of the electric machines 104 or first electric vehicles 106 from the second electric vehicle 108 by either scheduling the second electric vehicle 108 to visit the site 102 or charging when the second electric vehicle 108 is already scheduled to visit the site 102 for a noncharging purpose, instructing one of the first electric vehicles 106 to travel offsite to recharge, drawing down one of the electric machines 104 that is not scheduled to perform any tasks, etc.

A first charging operation is to charge one of more of the electric machines 104 from the first electric vehicles 106. The electric machines 104 can be connected to respective charge ports 110 of the first electric vehicles 106 to charge from the first electric vehicles 106. For example, the computer 100 can instruct the first electric vehicles 106 to electrically connect the charge ports 110 to the vehicle batteries 128 for scheduled charging of the electric machines 104. For another example, the computer 100 can instruct the first electric vehicles 106 to disconnect one of the charge ports 110 from the vehicle batteries 128 in response to an unscheduled charging of one of the electric machines 104 from that charge port 110.

A second charging operation is to charge one of the first electric vehicles 106 from one of the on-site chargers 130. The second charging operation may be constrained by the number of on-site chargers 130 at the site 102.

A third charging operation is to schedule the second electric vehicle 108 to visit the site 102 from offsite for charging at least one of the electric machines 104 or first electric vehicles 106 and to charge the at least one of the electric machines 104 or first electric vehicles 106 from the second electric vehicle 108. For example, the second electric vehicle 108 may visit multiple sites 102 to provide charging at those sites 102.

A fourth charging operation is to charge at least one of the electric machines 104 or first electric vehicles 106 from the second electric vehicle 108 that is scheduled to visit the site 102 from offsite for a noncharging purpose before generating the ordered allocation of the charging operations. In other words, the second electric vehicle 108 was already scheduled to visit the site 102 to, e.g., deliver construction materials, transport workers, etc. before the computer 100 generated the ordered allocation of charging operations.

A fifth charging operation is to instruct one of the first electric vehicles 106 to travel to a location offsite and recharge at that location, e.g., during the day. For example, the location can be a public charging facility or a charging facility operated by the operator of the first electric vehicles 106. The computer 100 can instruct the first electric vehicle 106 to return from the location offsite once fully charged or once charged to a first charge status. The first charge status can be determined by the computer 100 when generating the ordered allocation of charging operations in order to provide sufficient charge for performing the tasks.

A sixth charging operation is to instruct one of the first electric vehicles 106 to travel to a location offsite, recharge at the location, and remain at the location overnight. The fifth charging operation can be scheduled to occur at an end of a workday. The location can be a designated location for that first electric vehicle 106 to sit when not in use.

A seventh charging operation is to draw charge from one of the electric machines 104 that is not scheduled to perform any of the tasks. For example, the electric machine 104 can be connected to one of the charge ports 110 of one of the first electric vehicles 106, and that first electric vehicle 106 can recharge from the electric machine 104, thereby decreasing the charge stored in the electric machine 104.

As the electric machines 104 and first electric vehicles 106 are carrying out the plurality of tasks and the ordered allocation of charging operations, the computer 100 can determine whether the charge statuses indicate insufficient charge for performing at least one of the tasks. As noted above, the computer 100 can receive the charge statuses in real time. Insufficient charge can occur because one of the tasks is more difficult than expected, charging operations occurred that deviated from the ordered allocation, etc. For example, the computer 100 can determine that the expected energy consumption of the remaining tasks is greater than the sum of the charge statuses and any scheduled recharging of the first electric vehicles 106 from outside power sources. For another example, the computer 100 can determine that the charge status of one of the first electric vehicles 106 is less than the energy scheduled to be drawn from that first electric vehicle 106 in to-be-performed charging operations. For another example, the computer 100 can determine that the charge status of one of the electric machines 104 is less than the expected energy consumption of the task to be performed by that electric machine 104 and there are no charging operations scheduled for that electric machine 104.

In response to the charge statuses indicating insufficient charge for performing at least one of the tasks, the computer

100 can modify the ordered allocation of the charging operations. For example, the computer 100 can modify the ordered allocation of the charging operations using the same optimization as when generating the ordered allocation of the charging operations described above. The computer 100 can modify the ordered allocation of the charging operations using any of the charging operations described above. The computer 100 can also modify the ordered allocation of the charging operations with modifications described below, including turning off at least one of the electric machines 104, disconnecting the charge ports 110 of one of the first electric vehicles 106, switching one of the electric machines 104 between charge ports 110, moving one of the first electric vehicles 106 to a new location at the site 102, turning off a vehicle operation of one of the first electric vehicles 106, etc.

A first modification is to instruct at least one of the electric machines 104 to turn off according to the prioritization. For example, the computer 100 can instruct the electric machines 104 scheduled to perform the tasks that are lowest priority in the prioritization to turn off, thereby not performing the lowest-priority tasks.

A second modification is to instruct at least one of the first electric vehicles 106 to disconnect the charge ports 110 of that first electric vehicle 106 from the vehicle batteries 128. The first electric vehicle 106 can be selected based on the prioritization, e.g., as being the first electric vehicle 106 scheduled to provide charging to the electric machines 104 scheduled to perform the tasks that are lowest priority in the prioritization.

A third modification is to instruct a first one of the first electric vehicles 106 to switch one of the electric machines 104 from charging from one of the charge ports 110 of the first one to charging from one of the charge ports 110 of a second one of the first electric vehicles 106. The first one and the second one of the first electric vehicles 106 can be parked closely together at the site 102 so that the switch can happen without moving the electric machine 104 that is being switched.

The third modification can include instructing the first one or second one of the first electric vehicles 106 to output a message indicating to switch the one of the electric machines 104 from charging from the first one to the second one. A worker can then unplug the electric machine 104 from the charge port 110 of the first one of the first electric vehicles 106 and plug the electric machine 104 into the charge port 110 of the second one of the first electric vehicles 106.

Alternatively or additionally, the third modification can include instructing the first one or second one of the first electric vehicles 106 to actuate the robotic arm 126 of that first electric vehicle 106 to move a power cord of the electric machine 104 from the charge port 110 of the first one to the charge port 110 of the second one of the first electric vehicles 106. The first one and second one of the first electric vehicles 106 can be parked sufficiently close that the robotic arm 126 can reach the charge ports 110 of both the first one and second one of the first electric vehicles 106.

A fourth modification is to instruct one of the first electric vehicles 106 to travel from a current location at the site 102 to a new location at the site 102. For example, the first electric vehicle 106 may be able to provide charging to an electric machine 104 at the new location that otherwise would not have had sufficient charging.

A fifth modification is to instruct one of the first electric vehicles 106 to turn off an operation of that first electric vehicle 106. For example, the first electric vehicle 106 can turn off heating or air conditioning, lights, or other electronics of the first electric vehicle 106.

Figure 5:
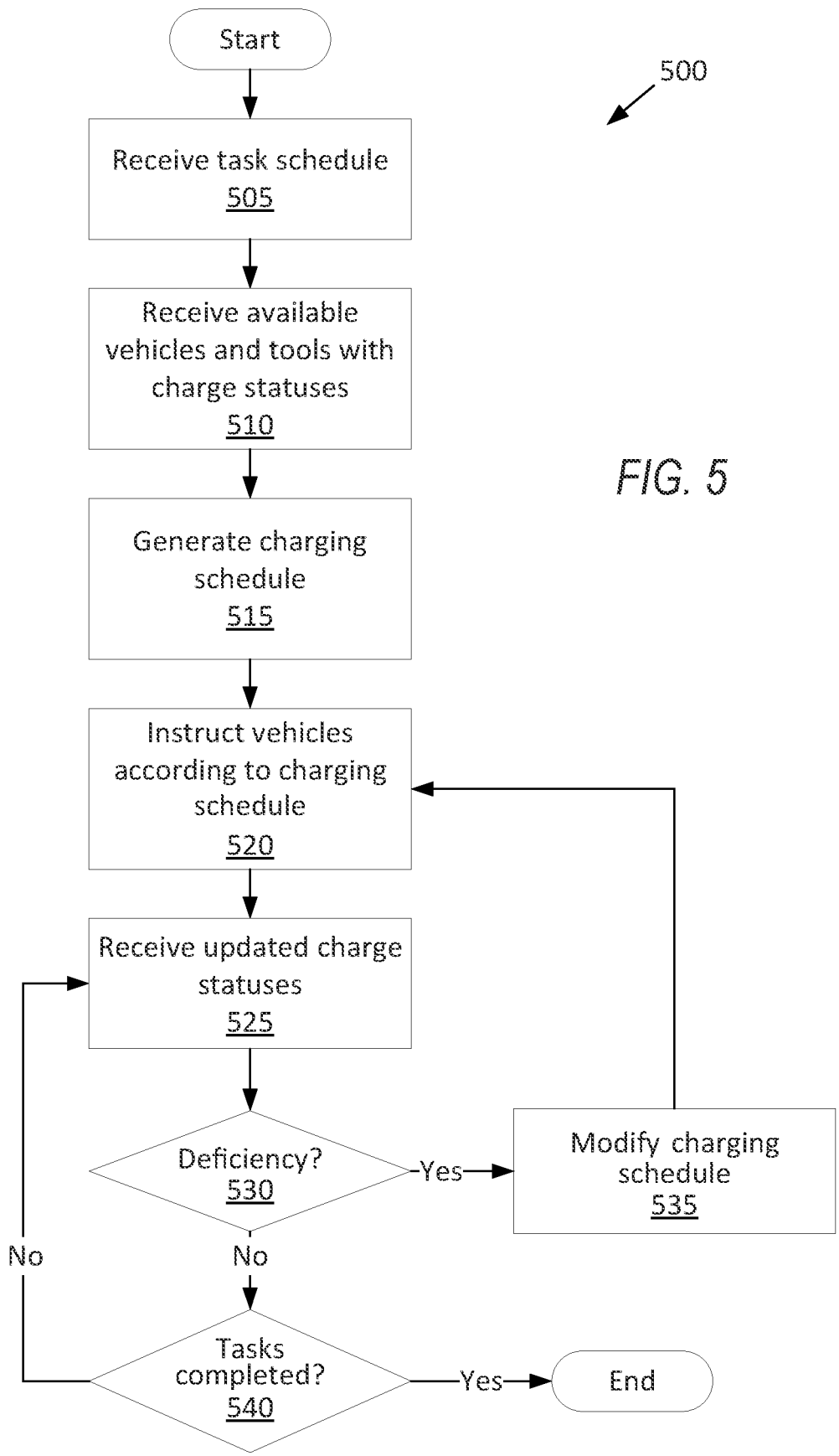
FIG. 5 is a process flow diagram of an example process for charging the electric vehicles and electric machines.

FIG. 5 is a process flow diagram illustrating an exemplary process 500 for charging the electric machines 104 and first electric vehicles 106. The memory of the computer 100 stores executable instructions for performing the steps of the process 500 and/or programming can be implemented in structures such as mentioned above. As a general overview of the process 500, the computer 100 receives the plurality of tasks, receives the availability and charge statuses of the electric machines 104 and the first electric vehicles 106, generates the ordered allocation of charging operations, and instructs the electric machines 104 and first electric vehicles 106 to follow the ordered allocation of charging operations. The computer 100 receives updates of the charge statuses in real time and, in response to the charge statuses indicating insufficient charge for performing at least one of the tasks, modifies the ordered allocation of charging operations. Receiving updated charge statuses and modifying the ordered allocation of charging operations continue until all the tasks are completed.

The process 500 begins in a block 505, in which the computer 100 receives the data indicating the plurality of the tasks, as described above.

Next, in a block 510, the computer 100 receives the availability and charge statuses of the electric machines 104 and the first electric vehicles 106, as described above.

Next, in a block 515, the computer 100 generates the ordered allocation of charging operations, as described above, for the electric machines 104 and first electric vehicles 106 that are available.

Next, in a block 520, the computer 100 instructs the electric machines 104 and first electric vehicles 106 to follow the ordered allocation of the charging operations, as described above.

Next, in a block 525, the computer 100 receives the charge statuses of the electric machines 104 and first electric vehicles 106, as updated in real time, as described above.

Next, in a decision block 530, the computer 100 determines whether the charge statuses indicate insufficient charge for performing at least one of the tasks, as described above. If so, the process 500 proceeds to a block 535. If not, the process 500 proceeds to a decision block 540.

In the block 535, the computer 100 modifies the ordered allocation of charging operations, as described above. After the block 535, the process 500 returns to the block 520 to instruct the electric machines 104 and first electric vehicles 106 to follow the now-updated ordered allocation of charging operations.

In the decision block 540, the computer 100 determines whether all the tasks have been completed. If not, the process 500 returns to the block 525 to continue receiving the updated charge statuses. If so, the process 500 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. Use of "in response to" and "upon determining" indicates a causal relationship, not merely a temporal relationship. The adjectives "first," "second," etc. are used throughout this document as identifiers and are not intended to signify importance, order, or quantity.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A computer comprising a processor and a memory storing instructions executable by the processor to:
receive data indicating a plurality of future tasks to be performed at a site by a plurality of electric machines;
receive charge statuses of the electric machines and of a plurality of first electric vehicles at the site; and
generate an ordered allocation of a plurality of charging operations for the electric machines and first electric vehicles based on the data indicating the plurality of the future tasks and on the charge statuses, the charging operations including charging at least one of the electric machines or first electric vehicles from a second electric vehicle with charge ports that is scheduled to visit the site from offsite;
wherein the second electric vehicle is scheduled to visit the site from offsite for a noncharging purpose before generating the ordered allocation of the charging operations.

2. The computer of claim 1, wherein the site is a bounded geographic area over which the first electric vehicles are authorized to travel.

3. The computer of claim 1, wherein the charging operations include scheduling the second electric vehicle to visit the site from offsite for charging the at least one of the electric machines or first electric vehicles.

4. The computer of claim 1, wherein the charging operations include charging the electric machines from the first electric vehicles.

5. The computer of claim 1, wherein the charging operations include instructing one of the first electric vehicles to travel to a location offsite and recharge at the location.

6. The computer of claim 5, wherein instructing the one of the first electric vehicles to travel to the location offsite includes instructing the one of the first electric vehicles to remain at the location overnight.

7. The computer of claim 1, wherein the charging operations include drawing charge from one of the electric machines that is not scheduled to perform any of the future tasks.

8. The computer of claim 1, wherein receiving the charge statuses occurs in real time, and the instructions further include instructions to modify the ordered allocation of the charging operations in response to the charge statuses indicating insufficient charge for performing at least one of the future tasks.

9. The computer of claim 8, wherein the instructions further include instructions to receive a prioritization of the future tasks, and modifying the ordered allocation of the charging operations includes instructing at least one of the electric machines to turn off according to the prioritization.

10. The computer of claim 8, wherein the first electric vehicles include respective pluralities of the charge ports, and modifying the ordered allocation of the charging operations includes instructing at least one of the first electric vehicles to disconnect the charge ports of that first electric vehicle.

11. The computer of claim 8, wherein the first electric vehicles include respective pluralities of the charge ports, and modifying the ordered allocation of the charging operations includes instructing at least one of a first one or a second one of the first electric vehicles to switch one of the electric machines from charging from one of the charge ports of the first one of the first electric vehicles to charging from one of the charge ports of the second one of the first electric vehicles.

12. The computer of claim 11, wherein instructing the at least one of the first one or the second one of the first electric vehicles to switch one of the electric machines includes instructing the at least one of the first one or the second one of the electric vehicles to output a message indicating to switch the one of the electric machines from charging from the one of the charge ports of the first one of the first electric vehicles to charging from the one of the charge ports of the second one of the first electric vehicles.

13. The computer of claim 11, wherein instructing the at least one of the first one or the second one of the first electric vehicles to switch one of the electric machines includes instructing the at least one of the first one or the second one of the electric vehicles to actuate a robotic arm to move a power cord of the one of the electric machines from the one of the charge ports of the first one of the first electric vehicles to the one of the charge ports of the second one of the first electric vehicles.

14. The computer of claim 8, wherein modifying the ordered allocation of the charging operations includes instructing one of the first electric vehicles to travel from a current location at the site to a new location at the site.

15. The computer of claim 8, wherein modifying the ordered allocation of the charging operations includes instructing one of the first electric vehicles to turn off an operation of that first electric vehicle.

16. The computer of claim 1, wherein the instructions further include instructions to instruct at least one of the first electric vehicles to disconnect a charge port of that first electric vehicle in response to an unscheduled charging of one of the electric machines from that charge port.

17. The computer of claim 1, wherein the future tasks include a plurality of types of the future tasks.

18. The computer of claim 17, wherein the electric machines include a plurality of types of the electric machines associated with the respective types of the future tasks.

19. A method comprising:
receiving data indicating a plurality of future tasks to be performed at a site by a plurality of electric machines;
receiving charge statuses of the electric machines and of a plurality of first electric vehicles at the site; and
generating an ordered allocation of a plurality of charging operations for the electric machines and first electric vehicles based on the data indicating the plurality of the future tasks and on the charge statuses, the charging operations including charging at least one of the electric machines or first electric vehicles from a second electric vehicle with charge ports that is scheduled to visit the site from offsite;
wherein the second electric vehicle is scheduled to visit the site from offsite for a noncharging purpose before generating the ordered allocation of the charging operations.

* * * * *